United States Patent [19]

Bentley

[11] Patent Number: 5,332,333
[45] Date of Patent: Jul. 26, 1994

[54] VACUUM EXTRACTION METHOD AND APPARATUS FOR REMOVING VOLATILE CONTAMINANTS FROM THE VADOSE LAYER OF CONTAMINATED EARTH

[76] Inventor: Harold W. Bentley, 6850 Moonglow Dr., Tucson, Ariz. 85718

[21] Appl. No.: 9,797

[22] Filed: Jan. 27, 1993

[51] Int. Cl.⁵ .................................................. B09B 1/00
[52] U.S. Cl. ..................................... 405/128; 405/258
[58] Field of Search ............... 405/128, 129, 258, 303; 166/267, 268

[56] References Cited

U.S. PATENT DOCUMENTS

| | | |
|---|---|---|
| Re. 33,102 | 10/1989 | Visser et al. |
| 4,167,973 | 9/1979 | Forte et al. |
| 4,183,407 | 1/1980 | Knopik |
| 4,469,176 | 9/1984 | Zison |
| 4,518,399 | 5/1985 | Croskell |
| 4,593,760 | 6/1986 | Visser et al. |
| 4,611,950 | 9/1986 | Russomano |
| 4,660,639 | 4/1987 | Visser et al. |
| 4,730,672 | 3/1988 | Payne |
| 4,765,902 | 8/1988 | Ely et al. |
| 5,106,232 | 4/1992 | Metzer et al. |
| 5,160,217 | 11/1992 | Metzer et al. ............ 405/128 |
| 5,161,914 | 11/1992 | Rahn et al. ............ 405/128 |

Primary Examiner—David H. Corbin
Attorney, Agent, or Firm—Greenlee and Winner

[57] ABSTRACT

Volatile contaminants are removed from the vadose zone of contaminated earth by vacuum extraction through a borehole placed into the contaminated area. Means are provided for substantially trapping water within the extraction borehole so as to prevent contaminated water from being brought to the surface. Means are also provided for maintaining substantially atmospheric pressure at the bottom of the extraction borehole so as to prevent water from the water table from rising into the borehole and to allow improved circulation of air through the contaminated zone.

20 Claims, 2 Drawing Sheets

VACUUM EXTRACTION METHOD AND APPARATUS FOR REMOVING VOLATILE CONTAMINANTS FROM THE VADOSE LAYER OF CONTAMINATED EARTH

FIELD OF THE INVENTION

This invention relates to an apparatus and process for removing volatile contaminants from the vadose zone of contaminated earth and for degrading volatile and nonvolatile compounds in the contaminated vadose zone.

BACKGROUND OF THE INVENTION

Methods presently exist for removing contaminants from underground areas. Excavation, treatment and reburial of the contaminated soil is one commonly applied method. However, the applicability of physical excavation of contaminated soils to most contaminated sites is limited. The process of excavation and treatment is very expensive and highly disruptive to any on-going plant operations. Furthermore, excavation is limited by practical considerations to relatively shallow depths.

In-situ liquid leaching of water soluble contaminants is another, less frequently applied method. Russomano (U.S. Pat. No. 4,611,950) and Forte et al. (U.S. Pat. No. 4,167,973) describe techniques for removal of contaminants from contaminated soil by liquid leaching. These approaches are generally limited to water soluble contaminants with low soil adsorption. Furthermore, the rate of water flow through the contaminated soil is limited to that obtainable by gravity drainage through the unsaturated zone, which can be very slow, limiting the effectiveness of the leaching process. Finally, the leaching process transports contaminants from the unsaturated zone to the water table, contaminating the saturated zone, which must then also be remediated.

In-situ soil vapor extraction, whereby soil gases containing volatile contaminants are extracted from the subsurface soils, has become an increasingly popular method over the past few years. The concept of venting soil gases from the unsaturated zone was generally first applied to control of landfill gases. Croskell (U.S. Pat. No. 4,518,399) provides a typical landfill gas recovery system design. Zison (U.S. Pat. No. 4,469,176) provides an improved landfill gas recovery process comprising controlling the pressure in the gas collection zone. Later, practitioners applied soil gas venting as a mechanism for remediation of contaminated subsurface soils. Knopik (U.S. Pat. No. 4,183,407) describes a vertical conduit with radial extensions that is used to exhaust underground contaminant vapors. The major shortcomings of this design are that it requires potentially disruptive excavation and that it is limited to shallow depths where excavation and emplacement of the radial conduits are feasible. These shortcomings were addressed by Visser et al. (U.S. Pat. No. 4,593,760, 4,660,639 and Re 33,102) and Payne (U.S. Pat. No. 4,730,672), who describe cased air wells containing conduit perforated in a specified interval above the water table from which soil vapors may be extracted or into which clean air may be injected. These designs can operate at arbitrary depths and are less disruptive, requiring no extensive areal excavation.

The use of soil vapor extraction to enhance biodegradation was disclosed by Ely and Heffner (U.S. Pat. No. 4,765,902) who describe the use of air wells to draw oxygen into a contaminated zone to stimulate microbial biodegradation of hydrocarbons. These wells are similar in construction to those disclosed in the patents by Visser et al. and by Payne.

The designs based on air wells containing perforated conduit (well casing) are deficient in several respects: First, owing to the air extraction's lowering of air pressure at the well, and therefore, a lowering of air temperature below that of the soil, some of the near-saturated water vapor drawn from the soil will condense onto the casing surfaces or into droplets in the air stream within the well. The low pressure can also cause liquid water in the soil to migrate and accumulate in the vicinity of the well; a portion of this water can then be drawn into the air well. As the air stream within the well casing moves to the land surface it entrains a portion of the water that has entered or condensed in the well. This water is brought to the surface and must be separated from the air stream. The separated water, which contains contaminants, must then be treated and disposed of, incurring additional disposal methods and costs. Secondly, over time, water carried to the well but not to the surface can accumulate in sufficient amount to cause downward infiltration of contaminated water and spread of contamination to soils or groundwater below the well. Thirdly, when an air well is operated in close proximity to the water table, the low pressure in the well can cause significant upwelling of the water table directly below the well, interfering with the well efficiency and increasing the quantity of water entrained in the extracted air stream.

Accordingly, there is the need for a process that will remove contaminant compounds from the soil by drawing air through the vadose zone of the soil and to the land surface, but will minimize the transport of contaminated water to the surface and/or to soils or groundwater beneath the contaminated zone and also will minimize upwelling of the water table where it is in close proximity to the contaminated vadose zone. The need has now been satisfied by the invention that is described below.

SUMMARY OF THE INVENTION

Contamination of soil and water by potentially hazardous compounds poses a serious threat to public health at numerous sites throughout the United States and the world at large. Mitigation of this threat requires either removal and disposal, destruction, or containment of the compounds in a manner that prevents human exposure. The invention described in this patent addresses each of these approaches to mitigation of human health risk. First, the invention may be used to remove volatile contaminants from the soil, water and air of underground areas. Second, the invention may be used to decompose contaminants found in the soil, water, and air of the vadose zone. Third, the invention may be used to diminish or prevent migration of contaminants from the vadose zone to the atmosphere or the groundwater, where they pose a threat to human health.

This invention provides a method and apparatus for removing volatile liquid contaminants from subsurface media within the vadose zone. Such media includes earth, water, nonaqueous liquids, air, gravel, landfill material, sludges, and other material lying within the vadose layer of the earth, i.e., the layer from the surface of the earth to the top of the water table. The underground medium must be porous enough to permit air flow, preferably it is composed of permeable materials such as silts, sands, and gravels. If the subsurface medium is relatively nonpermeable, e.g., clay, the vacuum extraction well can be operated so as to dry the surrounding clay so that it cracks and becomes more permeable whereby contaminants can flow into the well.

Contaminants may also be removed from the saturated layer between the top of the water table and the vadose layer by means of this invention.

The contaminants typically comprise hydrocarbons resulting from gasoline spills, and can include both gaseous and liquid components. For example, the contaminants can be aliphatic and/or aromatic hydrocarbons, halogenated hydrocarbons, or other volatile organic compounds. The contaminants may be percolating downwardly toward the water table, or may be relatively stationary in the vadose zone. Such contaminants can be volatilized when subjected to a flow of air induced by a borehole maintained at a pressure lower or higher than that of the atmosphere. The invention is preferably used for removal of contaminants having vapor pressures of at least about 20 mmHg at temperatures of about 25° C. or less, and is most preferably used for removal of contaminants having vapor pressures of about 100 mmHg at temperatures of about 25° C. or less. Contaminants having lower vapor pressures can be removed, but the rate of removing them is lower. The purpose of the invention is to volatilize and remove the contaminants directly from the contaminated zone so as to minimize the amount of contaminant that enters the saturated zone directly above the water table, or the water table itself. The treatment is effected in situ without substantial excavation or other disturbance of the subsurface media.

The apparatus of this invention comprises:
(a) an extraction borehole into said vadose earth;
(b) a layer of material having high gas permeability, preferably 1"gravel, disposed within said borehole at the level of at least a portion of said contaminated area of vadose earth;
(c) a sealing layer of material having low gas permeability, such as hydrated bentonite chips, disposed within said borehole beneath said layer of material having high gas permeability;
(d) a layer of material having medium to high gas permeability, such as sand, disposed within said borehole beneath said layer of material having low gas permeability;
(d) means for maintaining the bottom of said borehole below said sealing layer at substantially atmospheric pressure, preferably comprising a small diameter gas impermeable conduit, e.g., 1"PVC pipe, openly terminating at its lower end within said layer of medium to high gas permeability, preferably perforated in the section extending into said layer, and openly terminating at its upper end at or above the top of said borehole;
(e) a vacuum source connected to the top of said borehole whereby a gaseous stream containing volatile contaminants is pulled from said borehole and the surrounding contaminated area of vadose earth toward said vacuum source;
(f) means for removing volatile contaminants from said gaseous stream.

As will be appreciated by those skilled in the art, the small diameter conduit provides a means for maintaining the bottom of the extraction borehole at substantially atmospheric pressure to prevent rising of the water table into the borehole and to facilitate air circulation through the contaminated portion of the vadose earth. The sealing layer of material also acts to prevent water from rising into the borehole from below. The small diameter conduit is open at its lower end in the layer of material having medium to high gas permeability. Preferably it extends into this layer and is perforated, e.g., by slits of about 0.1 inch spaced about one-half inch apart along its length extending into said layer. Preferably the conduit is kept open and pressure is maintained by passive infiltration of atmospheric air into the bottom of the conduit. However, if desired, air may be injected into the conduit by positive pressure means. As will be appreciated by those of skill in the art, any means for maintaining substantially atmospheric pressure at the bottom of the extraction borehole may be used, e.g., conduits spaced outside the borehole, sparging of air under pressure into the water table below the borehole, or other means known to the art.

The pressure at the bottom of the borehole should be the same as or greater than the pressure at the surface of the underlying water table. Preferably from no less than about 0.5 psi below the ambient air pressure above ground up to about 2 psi above said ambient air pressure.

Any water entrained in the air circulating into the extraction borehole will be deposited in the layer of material having high gas permeability, e.g., the 1"gravel layer, so that it will not create a contaminated water disposal problem at the surface. Water accumulating in the borehole will exit the borehole at its lower end above the sealing layer and move downward into the porous soil. The air delivered to the borehole from the bottom of the borehole flows in a counter-current direction to the water exiting the borehole, thereby removing the volatile contaminants from the water and returning them to the borehole and thence to the surface where they are extracted.

The bottom of said extraction borehole can terminate in the saturated zone of earth above the water table. Advantages of this embodiment are that water is moved away from the formerly saturated zone so that air can be circulated through said zone to remove its volatile contaminants.

Suitable vacuum equipment such as air pumps, positive displacement vacuum blowers, regenerative blowers, turbine blowers and internal combustion engines, are known to the art. As will be appreciated by those of skill in the art, the volume of earth from which air can be extracted by means of said vacuum source depends on such variables as the permeability of the soils, the variation in permeability of the soils, and the location of boundaries to air flow such as a layer of pavement, building foundations, the water table, and the boundary between the soil surface and the atmosphere.

Preferably, the extraction borehole also comprises an upper layer of material having low gas permeability, such as hydrated bentonite chips, disposed in said borehole above said layer of material having high gas permeability; and a gas-impermeable conduit, e.g., 4"PVC pipe, radially inwardly spaced from the edges of said borehole extending through said upper layer of material having low gas permeability, which conduit openly terminates at its lower end in said layer of material having high gas permeability and has said vacuum source means connected to its upper end.

The top of said borehole is preferably covered with a well cover in a gas impermeable (e.g., concrete) lid.

In a further embodiment, the apparatus also comprises an injection borehole into the vadose layer of earth spaced apart from said extraction borehole such that an area of contaminated vadose earth lies between said extraction borehole and said injection borehole, inside of which borehole a layer of material having high gas permeability, such as 1"gravel, is disposed. The injection borehole may be connected to gas injection equipment whereby air or other gas may be injected into said borehole, or the top of the borehole may be left open for passive air infiltration.

Preferably, the injection borehole is filled above the layer of material having high gas permeability with an upper layer of material having low gas permeability, such as hydrated bentonite chips.

In one embodiment of this invention, a gas-impermeable conduit, such as a 4"PVC pipe, is radially inwardly spaced from the edges of said injection borehole extending through said upper layer of material having low gas permeability, which conduit openly terminates at its lower end in said layer of material having high gas permeability, and terminates at its upper end at the surface of the earth. Again, the conduit may be left open for passive air infiltration or may be connected to gas injection equipment whereby air or other gas may be injected into said borehole.

As will be appreciated by those of skill in the art, the injection borehole should be spaced apart from the extraction borehole a distance which will maximize efficient removal of volatile contaminants from the area between the two boreholes. In general, this distance should be between about 200 and about 260 feet for boreholes having a diameter of between about 8 and about 12 inches and air injection and extraction equipment having a capacity of between about 200 scfm and about 300 scfm for sandy soil having a permeability of about 10 darcies with a thickness of about 10 feet. When passive infiltration is used for the injection borehole rather than positive injection of air or other gas, the distance between the injection and extraction boreholes should be between about 8 and about 12 feet. Those of skill in the art will readily be able to calculate appropriate distances for other types of soil, varying areas of contamination, varying sizes of boreholes, and injection and extraction equipment of varying capacities. The appropriate distances between boreholes can vary widely, e.g., from as far as a mile to as little as 5 or 10 feet.

In a preferred embodiment of this invention, the injection borehole also comprises a layer of solid gas-impermeable material such as concrete disposed in said injection borehole above said upper layer of material having low gas permeability, which serves as a lid to the borehole, and a well cover disposed atop said borehole.

This invention also comprises a method for removing non-naturally-occurring volatile liquid contaminant from a contaminated area of vadose earth comprising:
 (a) establishing an extraction borehole extending downwardly from the surface of the ground within the contaminated area;
 (b) disposing at the bottom of said borehole a layer of material having medium to high gas permeability, such as sand;
 (c) disposing in said borehole above said layer of material having medium to high gas permeability, a sealing layer of material having low gas permeability, such as hydrated bentonite chips;
 (d) disposing in said borehole above said sealing layer of material a layer of material having high gas permeability, such as 1"gravel, at the level of at least a portion of said contaminated area of vadose earth;
 (e) maintaining the bottom of said extraction borehole below said sealing layer at substantially atmospheric pressure, for example by placing within said borehole a small diameter conduit openly terminating at its lower end within said layer of medium to high gas permeability at the bottom of the borehole and openly terminating at its upper end at or above the top of said borehole;
 (f) operating a vacuum source connected to the top of said borehole to pull a gaseous stream containing volatile contaminants from said borehole and the surrounding contaminated area of vadose earth toward said vacuum source;
 (g) removing volatile contaminants from said gaseous stream. The gaseous stream from which volatile contaminants are removed, preferably at or above the surface, is desirably sufficiently free of entrained water such that removal and treatment of contaminated water is not required.

In a further embodiment, the method comprises:
 (a) establishing an injection borehole into the vadose layer of earth, spaced apart from said extraction borehole such that an area of contaminated vadose earth lies between said extraction borehole and said injection borehole, inside of which injection borehole a layer of material having high gas permeability, such as 1"gravel, is disposed;
 (b) drawing a gaseous stream from said injection borehole by means of said vacuum source through the vadose earth into said extraction borehole, whereby volatile contaminants are removed from said contaminated area of vadose earth by said gaseous stream.

The method may also comprise:
 (a) disposing in said injection borehole an upper layer of material having low gas permeability, such as hydrated bentonite chips, above said layer of material having high gas permeability;
 (b) placing a gas-impermeable conduit, e.g., 4"PVC pipe, in said injection borehole radially inwardly spaced from the edges of said injection borehole extending through said upper layer of material having low gas permeability, which conduit openly terminates at its lower end in said layer of material having high gas permeability, and terminates at its upper end at the surface of the earth;
 (c) connecting gas injection equipment to the upper end of said gas impermeable conduit in said injection borehole and injecting a gaseous stream into said borehole such that said gaseous stream is distributed through said layer of material having high gas permeability into the contaminated area of vadose earth and is drawn out through said extraction borehole, whereby volatile contaminants are removed from said contaminated area of vadose earth by said gaseous stream.

The gaseous stream may be air, or other gases or mixtures of gases such as nitrogen, carbon dioxide, methane, or argon. In one embodiment the gaseous stream comprises volatile substances fostering the growth of microbes which degrade contaminants in the vadose layer of earth. For example, methane and oxygen, are included in the gas stream to foster the growth of methotrophic bacteria which then degrade chlorinated ethylenes and branched-chain hydrocarbons. The gaseous stream may also be heated, as is known to the art, to facilitate removal of volatile contaminants from the soil.

It is also contemplated that volatile contaminants may be extracted from said gaseous stream and the gaseous stream recirculated into said injection borehole.

By means of this invention, the need for equipment to extract contaminants from water entrained in the gaseous stream is minimized, and preferably completely eliminated, as is the need for equipment to remove water from the boreholes.

Figure 2:
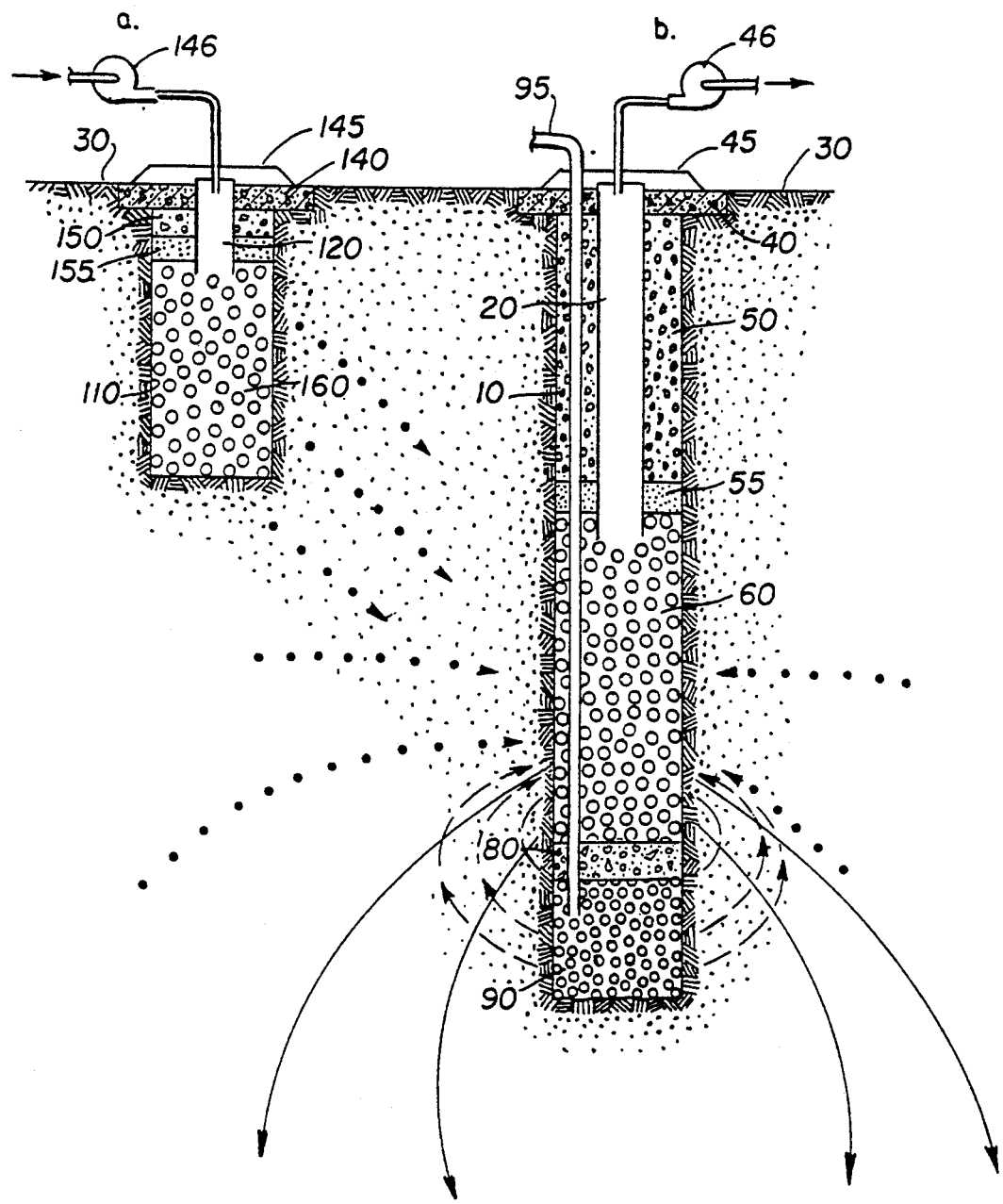
FIG. 2a depicts the injection borehole of an embodiment of this invention.
FIG. 2b depicts the extraction borehole of an embodiment of this invention. The figure is not drawn to scale.

Dotted arrows in FIG. 2 depict air flow; solid arrows depict water flow out and down from the extraction borehole; and dashed arrows depict countercurrent airflow from the area of substantially atmospheric pressure at the bottom of the extraction borehole into the layer of high gas permeability in said borehole.

DETAILED DESCRIPTION OF THE PREFERRED EMBODIMENTS

Figure 1:
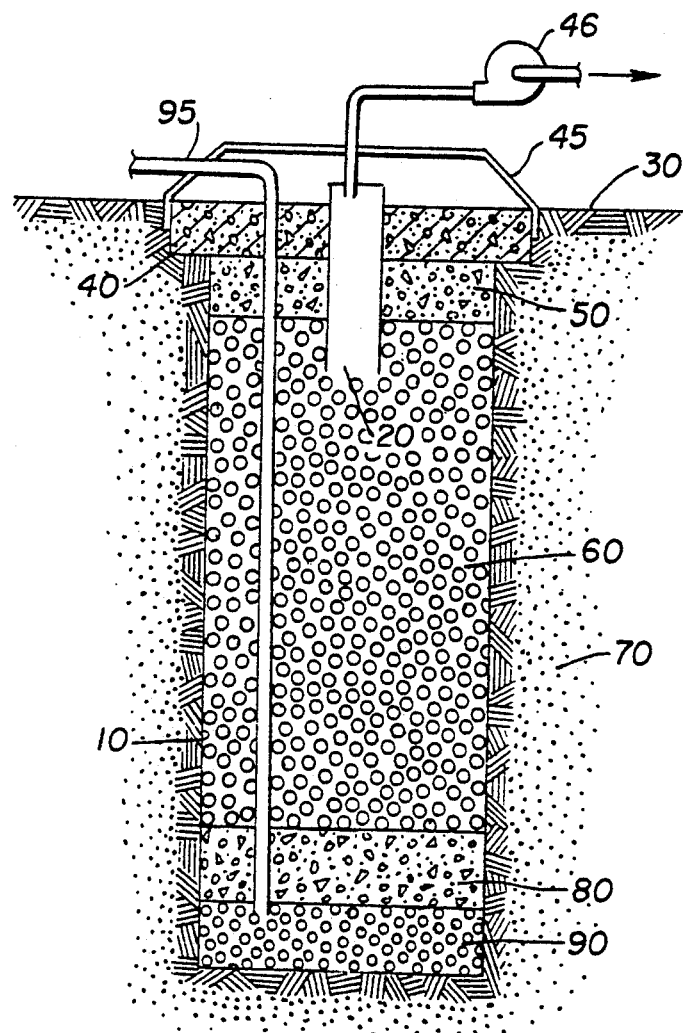
FIG. 1 depicts the extraction borehole of an embodiment of this invention. The figure is not drawn to scale.

The invention disclosed herein works to remove volatile compounds from the vadose zone of the earth and dispose of them at land surface. Air flow induced through borehole 110 (FIG. 2a) flows through soil containing volatile compounds and carries volatile compounds in the soil gas toward extraction borings as shown in FIGS. 1 and 2b to the land surface. Volatile compounds dissolved in the soil water, adsorbed to the soil, or dissolved in nonaqueous soil liquids are then redistributed by chemical forces which tend to drive the system to reattaining chemical equilibrium with the soil gas; those compounds redistributed into the flowing air are also carried to the land surface. The extracted, contaminated air is subsequently treated and exhausted to the atmosphere or re-injected into the ground. Over time, this process reduces the concentration of the volatile compounds in the soil, water, nonaqueous liquids and air of underground soils.

When the contaminant concentrations in the higher permeability zones of the soil have been reduced, a concentration gradient is produced between these zones and those contaminated zones of the soil that are low in permeability and thus poorly swept by the moving air. This concentration gradient drives volatile compounds from the lower to the higher permeability zones by gas diffusion where they are removed by flowing air.

The airflow induced by the extraction or injection borings can also be used to stimulate microbial degradation in a number of ways. It is possible to utilize the injection borings to introduce gaseous chemical compounds into the soil that stimulate microbial activity. These compounds include volatile nutrients necessary for the growth and maintenance of the soil microbes, volatile food sources that stimulate the growth of microbes that can degrade soil contaminants, and volatile food sources that stimulate the microbial production of nutrients. Also, volatile compounds that inhibit microbial degradation of other soil contaminants can be removed by means of the injection and extraction borings.

As shown in FIG. 1 and FIG. 2b, the apparatus comprises an extraction borehole 10. The size of the borehole is not critical, but is preferably between about 4 and about 36 inches in diameter, and more preferably between about 7 and about 12 inches in diameter. The borehole extends generally downwardly into the vadose layer of the earth which has been contaminated with volatile contaminants 70 a sufficient distance to penetrate into the contaminated area, and may extend to the saturation zone which lies above the water table and below the vadose level, or may terminate above that point. As will be appreciated by those of skill in the art, the upper limits of size and length of the borehole are determined by vertical extent of contamination and the capacity of the vacuum source 46 used to extract air from the borehole.

The borehole is fitted with a well cover 45 set over a lid 40 of impermeable solid material such as concrete. Penetrating the lid 40 is a conduit or well casing 20 radially inwardly spaced from the edges of said borehole so that a ring or annular zone is defined between the wall of the borehole and the conduit. Conduit 20 is of a size sufficient to accommodate the air flow toward said vacuum source 46, to which it is connected at its upper end, and is preferably between about 3 and about 6 inches in diameter. Conduit 20 may be defined by the gas-impermeable material surrounding it or may be made of impermeable material such as PVC piping, and is open at its lower end. The length of conduit 20 is determined by the depth to the soil zone from which air is to be extracted.

Conduit 20 is surrounded below lid 40 with an upper layer of material 50 having low gas permeability such as hydrated bentonite or cement grout filled into the annular space between the edges of the borehole and the exterior of the conduit. The depth of this layer is sufficient to minimize the short-circuiting of airflow between the borehole and land surface, and is preferably greater than about five feet. If layer 50 is composed of cement grout, a further layer of material having low permeability to cement grout, such as about six inches of fine silica sand, can be placed below layer 50 to prevent cement grout from flowing below it.

At its lower end, conduit 20 terminates at the top of, or a short distance, e.g., about 12 inches, into a layer of material 60 having high gas permeability such as coarse, e.g., 1"gravel, with which the borehole has been packed. The layer of material having high gas permeability 60 extends downwardly from just above the lower end of conduit 20 through the length where extraction of contaminants from the vadose zone is desired. This layer is of a depth sufficient to conduct air through the depth of the contaminated soil zone, preferably at least about 3 feet, and of a grain size sufficient to prevent substantial pressure loss in the well, preferably at least about 1 inch.

Below the layer of material 60 having high gas permeability, the borehole is packed with a sealing layer of material 80 having low gas permeability such as hydrated bentonite or cement grout. This layer is of a depth sufficient to prevent air and water from flowing upward into the borehole from the area directly under the lower terminus of the borehole.

Below this layer of low permeability 80, the borehole is filled with a layer having medium to high gas permeability 90, such as sand or gravel. This layer is of a depth sufficient to supply about 10 percent of the air delivered to the layer of material having high gas permeability 60, and is preferably between about 12 and about 24 inches in depth.

The extraction borehole is equipped with a small diameter impermeable conduit 95 extending from above the land surface 30 through lid 40, downwardly into the layer of medium to high gas permeability 90, and preferably running through the annular space defined by the outer surface of conduit 20 and the edges of the borehole at its upper end, through the layer of material 50 having low gas permeability, down through the layer of material having high gas permeability 60, the sealing layer 80, and terminating within the layer of medium to high gas permeability 90. Conduit 95 is open to the atmosphere at its upper end, although it may be equipped with a valve to limit air flow, and is also open at its lower end, preferably being perforated at its lower end. It may be connected to means for injecting pressurized air at its upper end.

As shown in FIG. 2a, the apparatus may also include an injection borehole. This borehole extends downward into the vadose zone covering a vertical length where it is desired that air be injected or allowed to permeate. This length is generally sufficient to cover the contaminated zone. As will be appreciated by those of skill in the art, depending on parameters such as area and amount of contamination, soil permeability, etc., more than one extraction borehole e.g., three or four, may be spaced around the injection borehole, and three or four injection boreholes may be spaced around one extraction borehole.

The injection borehole may be equipped with a well cover 145 and a lid 140. The injection borehole may also be equipped with an impermeable conduit 120 radially inwardly spaced from the edges of the borehole extending downward a distance sufficient to minimize the short-circuiting of air to the surface, preferably a distance of about five feet. The upper end of conduit 120 may be connected to air or gas injection equipment 146, or may be left open to the atmosphere.

The annular space between conduit 120 and the edge of the injection borehole is filled with a layer of material 150 which is of low gas permeability, such as hydrated bentonite chips or cement grout, extending downward a distance sufficient to minimize loss of air to the surface, preferably about five feet.

Below this layer of low gas permeability 150, still within the annular space defined by conduit 120 and the edges of the borehole, when cement grout has been used for layer 150, it is preferred that a layer of material having low permeability to cement grout 55, e.g., fine silica sand, is disposed. This layer should be of a depth sufficient to prevent cement grout from flowing below it, and is preferably about 6 inches.

Conduit 120 terminates at its lower end at the top of or a short distance, e.g., about 12 inches, into in a layer of material having high gas permeability 160, such as coarse (e.g., 1") gravel which has been filled into the borehole. This layer extends downward through the area of vadose earth into which air is desired to be injected.

The injection borehole 110 is preferably spaced a distance from extraction borehole 10 sufficient to supply approximately 50 percent of the air flowing to the extraction borehole.

In an alternative embodiment, where passive rather than active air injection is desired, injection borehole 110 may be left open to the atmosphere at the top and filled in entirely with a layer of material of high gas permeability such as coarse gravel. In this embodiment, no conduit 120, lid, cover, or air injection equipment is required.

In operation, the upper end of conduit 20 of FIGS. 1 and 2b is connected to a suitable vacuum source 46. A suitable gas recovery, treatment, or discharge system may be positioned at any point in the gaseous stream, and may be included with vacuum source 46 if desired. The vacuum source creates a low pressure in the layer of material having high gas permeability 60 occupying the central interval of the borehole 10. This lowered pressure induces flow of vapor from the vadose zone into the high gas permeability layer. This high permeability material is provided to both fill and stabilize the borehole and to intercept water droplets and condense water vapor, thereby removing water from the air stream flowing to the vacuum source and reducing or eliminating the costs associated with separation, treatment and disposal of liquid produced by air extraction wells.

Near the bottom of borehole 10, the layer of gas impermeable material 80 seals the upper end of the borehole against direct upward flow of air so that clean air delivered below the borehole from the land surface will migrate through soils below and in the vicinity of the layer of medium to high gas permeability 90 and remove volatile contaminants from these soils.

The small diameter conduit 95 established in borehole 10 is preferably perforate at its lower end, i.e., in that portion of the conduit extending into the layer of medium to high gas permeability 90. This layer 90 stabilizes the borehole against collapse and encloses the end of small diameter conduit 95 so that clean air from the surface can be conducted to soils at the bottom of the borehole.

The lower end of small diameter conduit 95 serves two purposes. One is to maintain the bottom of the borehole at near-atmospheric pressure by providing a conduit from the atmosphere to the layer of medium to high gas permeability 90 in the bottom of the bore, and thus maintain the bottom of the borehole at near-atmospheric pressure, significantly reducing or eliminating upwelling of the water table in the vicinity of the borehole.

The second purpose is to circulate clean air through the soils surrounding the lower portion of the extraction boring. Because the layer of medium to high gas permeability surrounding the bottom of conduit 95 is held at near atmospheric pressure, air moves from this layer through the unsaturated soils around the gas-impermeable layer 80 into the lower pressure layer of high gas permeability 60. This circulating air strips volatile contaminants from any water that accumulates at the layer of high gas permeability 60 as said water moves downward toward the layer of low gas permeability 80 and infiltrates outward from the borehole and downward to soils or water below the depth of the borehole.

As will be appreciated by those skilled in the art, the air flow pattern circulating in the soil surrounding the bottom of the borehole may be influenced by varying the depth of sealing layer 80, the capacity of the vacuum source, and the use of positive pressure in the air or gases injected into the top of small diameter conduit 95. Positive pressure becomes most desirable when the borehole terminates at or near the top of the water table.

The top of borehole 10 is sealed with gas impermeable layer 40 and lid 50 to prevent air leaking downward from the surface into the layer of high gas permeability 60, and to stabilize the upper interval of the borehole, thus keeping a high vacuum in the layer of high gas permeability 60.

A second borehole 110 of FIG. 2a may also be used to inject air into the vadose zone, either passively or by positive pressure. The layer of highly permeable material 160 in this borehole provides a pathway to distribute injected air over the interval of the borehole in which it is packed and also stabilizes the borehole against caving. Impermeable conduit 120 established from the top of the layer of highly gas permeable material 160 to at or above the land surface serves to conduct injected air to the interval of the borehole where it is to be distributed. The layer of low gas permeability 150 placed around the conduit to fill the borehole from the layer of highly gas permeable material 160 to the surface serves to prevent significant air leakage from the layer of high gas permeability 160 to or through the upper interval of the borehole.

A pressure source 146 may be connected to the upper end of the impermeable conduit 120 which causes air to flow downward through the conduit into the layer of highly gas permeable material 160 and then into the vadose zone surrounding the interval of the borehole packed with the highly gas permeable material.

Alternatively, should passive, rather than active air injection be desired, the top of impervious conduit 120 can be left open or the borehole can be entirely filled with high permeability material. In any event, the expense of perforated casing is avoided.

Although particular preferred embodiments of the invention have been disclosed in detail for illustrative purposes, it will be recognized that variations or modifications of the disclosed apparatus and method, including the rearrangement of parts and steps, lie within the scope of the present invention.

I claim:

1. An apparatus for removing non-naturally-occurring volatile liquid contaminant from a contaminated area of vadose earth comprising;
   (a) an extraction borehole into said vadose earth;
   (b) a layer of material having high gas permeability disposed within said borehole at the level of at least a portion of said contaminated area of vadose earth;
   (c) a sealing layer of material having low gas permeability disposed within said borehole beneath said layer of material having high gas permeability;
   (d) a layer of material having medium to high gas permeability disposed within said borehole beneath said layer of material having low gas permeability;
   (d) means for maintaining the bottom of said extraction borehole below said sealing layer at substantially atmospheric pressure;
   (e) a vacuum source connected to the top of said borehole whereby a gaseous stream containing volatile contaminants is pulled from said borehole and the surrounding contaminated area of vadose earth toward said vacuum source;
   (f) means for removing volatile contaminants from said gaseous stream.

2. An apparatus of claim 1 wherein said means for maintaining the bottom of said extraction borehole at substantially atmospheric pressure comprises a small diameter conduit openly terminating at its lower end within said layer of medium to high gas permeability and terminating at its upper end at or above the top of said borehole.

3. An apparatus of claim 1 also comprising;
   (a) an upper layer of material having low gas permeability disposed in said borehole above said layer of material having high gas permeability;
   (b) a gas-impermeable conduit radially inwardly spaced from the edges of said borehole extending through said upper layer of material having low gas permeability, which conduit openly terminates at its lower end in said layer of material having high gas permeability and has said vacuum source means connected to its upper end.

4. An apparatus of claim 1 wherein said small diameter conduit is perforated along its length extending into said layer of medium to high gas permeability.

5. An apparatus of claim 1 wherein the bottom end of said borehole terminates in the saturated layer of the earth between the vadose layer of earth and the water table.

6. An apparatus of claim 2 wherein a layer of solid gas-impermeable material is disposed in said borehole above said upper layer of material having low gas permeability extending to the earth's surface, and wherein a well cover is disposed atop said borehole.

7. An apparatus of claim 1 also comprising an injection borehole into the vadose layer of earth spaced apart from said extraction borehole such that an area of contaminated vadose earth lies between said extraction borehole and said injection borehole, inside of which injection borehole a layer of material having high gas permeability is disposed.

8. An apparatus of claim 7 wherein said injection borehole is connected to gas injection equipment whereby gases may be injected into said borehole.

9. An apparatus of claim 7 also comprising;
   (a) an upper layer of material having low gas permeability disposed in said injection borehole above said layer of material having high gas permeability;
   (b) a gas-impermeable conduit radially inwardly spaced from the edges of said injection borehole extending through said upper layer of material having low gas permeability, which conduit openly terminates at its lower end in said layer of material having high gas permeability, and terminates at its upper end at the surface of the earth.

10. An apparatus of claim 9 wherein said gas-impermeable conduit is connected to gas injection equipment whereby air or other gas may be injected into said injection borehole.

11. An apparatus of claim 10 wherein a layer of solid gas-impermeable material is disposed in said injection borehole above said upper layer of material having low gas permeability extending to the earth's surface, and wherein a well cover is disposed atop said injection borehole.

12. An apparatus of claim 1 wherein said material having high gas permeability comprises 1"gravel.

13. An apparatus of claim 1 wherein said material having low gas permeability comprises hydrated bentonite chips.

14. An apparatus of claim 1 wherein said material having medium to high gas permeability comprises sand.

15. An apparatus for removing non-naturally-occurring volatile liquid contaminant from a contaminated area of vadose earth comprising;

(a) an extraction borehole into said vadose earth;

(b) a layer of material having high gas permeability disposed within said extraction borehole at the level of at least a portion of said contaminated area of vadose earth;

(c) a sealing layer of material having low gas permeability disposed within said extraction borehole beneath said layer of material having high gas permeability;

(d) a layer of material having medium to high gas permeability disposed within said extraction borehole beneath said layer of material having low gas permeability;

(e) a small diameter conduit openly terminating at its lower end within said layer of medium to high gas permeability, wherein said small diameter conduit is perforated along its length extending into said layer of medium to high gas permeability, and openly terminates at its upper end at or above the top of said extraction borehole, whereby the bottom of said borehole is maintained at substantially atmospheric pressure;

(f) an upper layer of material having low gas permeability disposed in said extraction borehole above said layer of material having high gas permeability;

(g) a gas-impermeable conduit radially inwardly spaced from the edges of said extraction borehole extending through said upper layer of material having low gas permeability, which conduit openly terminates at its lower end in said layer of material having high gas permeability;

(h) a layer of solid, gas-impermeable material disposed in said extraction borehole above said upper layer of material having low gas permeability extending to the earth's surface, and a well cover disposed atop said borehole.

(i) a vacuum source connected to the upper end of said gas-impermeable conduit whereby a gaseous stream containing volatile contaminants is pulled from said extraction borehole and the surrounding contaminated area of vadose earth toward said vacuum source;

(j) means for removing volatile contaminants from said gaseous stream;

(k) an injection borehole into the vadose layer of earth, spaced apart from said extraction borehole such that an area of contaminated vadose earth lies between said extraction borehole and said injection borehole, inside of which injection borehole a layer of material having high gas permeability is disposed;

(l) an upper layer of material having low gas permeability disposed in said injection borehole above said layer of material having high gas permeability;

(m) a gas-impermeable conduit radially inwardly spaced from the edges of said injection borehole extending through said upper layer of material having low gas permeability, which conduit openly terminates at its lower end in said layer of material having high gas permeability, and terminates at its upper end at the surface of the earth;

(n) a layer of solid gas-impermeable material disposed in said injection borehole above said upper layer of material having low gas permeability extending to the earth's surface, and a well cover disposed atop said injection borehole;

(o) gas injection equipment connected to said gas-impermeable conduit in said injection borehole whereby air or other gas may be injected into said borehole.

16. A method for removing non-naturally-occurring volatile liquid contaminant from a contaminated area of vadose earth comprising;

(a) establishing an extraction borehole extending downwardly from the surface of the ground within the contaminated area;

(b) disposing at the bottom of said borehole a layer of material having medium to high gas permeability;

(c) disposing in said borehole above said layer of material having medium to high gas permeability, a sealing layer of material having low gas permeability;

(d) disposing in said borehole above said sealing layer of material a layer of material having high gas permeability at the level of at least a portion of said contaminated area of vadose earth;

(e) maintaining the bottom of said extraction borehole below said sealing layer at substantially atmospheric pressure;

(f) operating a vacuum source connected to the top of said borehole to pull a gaseous stream containing volatile contaminants from said borehole and the surrounding contaminated area of vadose earth toward said vacuum source;

(g) removing volatile contaminants from said gaseous stream.

17. A method of claim 16 wherein said means for maintaining the bottom of said borehole at substantially atmospheric pressure comprises placing within said borehole a small diameter conduit openly terminating at its lower end within said layer of medium to high gas permeability and terminating at its upper end at or above the top of said borehole.

18. A method of claim 16 also comprising;

(a) establishing an injection borehole into the vadose layer of earth, spaced apart from said extraction borehole such that an area of contaminated vadose earth lies between said extraction borehole and said injection borehole, inside of which injection borehole a layer of material having high gas permeability is disposed;

(b) drawing a gaseous stream from said injection borehole by means of said vacuum source through the vadose earth into said extraction borehole, whereby volatile contaminants are removed from said contaminated area of vadose earth by said gaseous stream.

19. A method of claim 18 also comprising;

(a) disposing in said injection borehole an upper layer of material having low gas permeability above said layer of material having high gas permeability;

(b) placing a gas-impermeable conduit in said injection borehole radially inwardly spaced from the edges of said injection borehole extending through said upper layer of material having low gas permeability, which conduit openly terminates at its lower end in said layer of material having high gas permeability, and terminates at its upper end at the surface of the earth;

(c) connecting gas injection equipment to the upper end of said gas impermeable conduit in said injection borehole and injecting a gaseous stream into said borehole such that said gaseous stream is distributed through said layer of material having high gas permeability into the contaminated area of vadose earth and is drawn out through said extraction borehole, whereby volatile contaminants are removed from said contaminated area of vadose earth by said gaseous stream.

20. A method of claim 16 also comprising injecting into said injection borehole a gaseous stream comprising substances fostering the growth of microbes which degrade contaminants in the vadose layer of earth.

* * * * *